(12) United States Patent  
Webberley

(10) Patent No.: US 11,536,541 B2  
(45) Date of Patent: Dec. 27, 2022

(54) APPARATUS AND METHOD FOR MONITORING AND CONTROLLING A HAZE LEVEL

(71) Applicant: Andrew Webberley, Burbank, CA (US)

(72) Inventor: Andrew Webberley, Burbank, CA (US)

( * ) Notice: Subject to any disclaimer, the term of this patent is extended or adjusted under 35 U.S.C. 154(b) by 410 days.

(21) Appl. No.: 16/875,125

(22) Filed: May 15, 2020

(65) Prior Publication Data

US 2020/0370870 A1 Nov. 26, 2020

Related U.S. Application Data

(60) Provisional application No. 62/848,200, filed on May 15, 2019.

(51) Int. Cl.
*F41H 9/06* (2006.01)
*A63J 5/02* (2006.01)
*G01N 21/61* (2006.01)

(52) U.S. Cl.
CPC .............. *F41H 9/06* (2013.01); *A63J 5/025* (2013.01); *G01N 21/61* (2013.01); *G01N 2201/06113* (2013.01)

(58) Field of Classification Search
CPC . F41H 9/06; A63J 5/025; G01N 21/61; G01N 2201/06113; G01N 15/06; G01N 2015/0038; G01N 2015/0693
See application file for complete search history.

(56) References Cited

U.S. PATENT DOCUMENTS 4,990,290 A  2/1991 Gill et al.
6,930,455 B2  8/2005 Chansky et al.
(Continued)

FOREIGN PATENT DOCUMENTS

CN  205749203 U  11/2016

OTHER PUBLICATIONS

Moline et al., Health Effects Evaluation of Theatrical Smoke, Haze and Pyrotechnics, Jun. 6, 2000, U.S.
(Continued)

*Primary Examiner* — David P Porta
*Assistant Examiner* — Meenakshi S Sahu
(74) *Attorney, Agent, or Firm* — Law Offices of John J. Skinner, Jr.; John J. Skinner, Jr.

(57) ABSTRACT

An apparatus for monitoring and controlling a haze and/or particulate level in the air is disclosed. The apparatus comprises a detecting unit (sensor) and a controller. The detecting unit is configured to detect the haze and/or particulate level in real time. The controller in communication with the detecting unit is configured to receive data related to a haze level from the detecting unit. The apparatus further comprises a display and a control switch. The display in communication with the controller is configured to display data related to the haze level monitored by one or more sensors. The sensors are laser based particulate sensors. The control switch in communication with the controller is configured to send a signal to control a haze generator, thereby monitoring the haze level in real time and controlling the haze generator at predetermined time periods using the control switch for attaining and maintaining a desired haze level.

20 Claims, 11 Drawing Sheets

(56) References Cited

U.S. PATENT DOCUMENTS

| | | |
|---|---|---|
| 7,018,563 B1 | 3/2006 | Sutherland et al. |
| 7,072,020 B1 | 7/2006 | Sutherland et al. |
| 7,486,391 B2 | 2/2009 | Chen et al. |
| 7,969,560 B2 | 6/2011 | Kostuch et al. |
| 8,680,390 B2 | 3/2014 | McMillen et al. |
| 9,000,909 B2 | 4/2015 | Batchelder et al. |
| 9,759,528 B2 | 9/2017 | Scully |
| 9,962,741 B2 | 5/2018 | Schneider et al. |
| 9,995,667 B2 | 6/2018 | Hart et al. |
| 10,281,167 B2 | 5/2019 | Martin |
| 10,500,520 B2 * | 12/2019 | Pogue .................... A63J 5/025 |
| 2012/0268281 A1 | 10/2012 | Hejmose |
| 2015/0077737 A1 | 3/2015 | Belinsky et al. |
| 2019/0321757 A1 | 10/2019 | Jakpor |

OTHER PUBLICATIONS

Environ Int'l Corp., Equipment-Based Guidelines for the Use of Theatrical Smoke and Haze, Jun. 8, 2001, U.S.

Environ Int'l Corp., Evaluation of Short-Term Exposures to Theatrical Smoke and Haze, May 14, 2001, U.S.

Actors' Equity Association, Theatrical Smoke and Haze Regulations, https://www.actorsequity.org/resources/Producers/safe-and-sanitary/smoke-and-haze/.

Ramboll Group, Theatrical Smoke, Fog and Haze Testing: Calibration Factors, Dec. 2019, U.S.

Thermo Electron Corp., Instruction Manual—Models PDR-1000AN & PDR-1200S, Jan. 2004, U.S.

* cited by examiner

APPARATUS AND METHOD FOR MONITORING AND CONTROLLING A HAZE LEVEL

CROSS REFERENCE TO PRIOR APPLICATION

This patent application claims the benefit of U.S. Provisional Application No. 62/848,200 filed on May 15, 2019. The above provisional application is incorporated by reference herein in its entirety.

FIELD OF THE INVENTION

The present invention generally relates to a haze (atmospheric smoke/haze and/or particulate) monitoring and trigger control system. More particularly, one or more laser based particulate sensors measure a haze level present in the air and transmits a reading of such to a controller, and/or to a console that displays each reading, and based on a variable level (controlled locally or remotely) triggers an outside system to turn ON/OFF the haze generating devices thereby acting to control the haze level.

BACKGROUND OF THE INVENTION

Haze machines, or haze generators (commonly referred as hazers), are similar to fog machines, designed to produce an unobtrusive, homogeneous clouds suspended in the air intended primarily to make light beams visible and/or create a subtle diffusion. The haze generators are used in a variety of applications such as in security applications, for simulating fire as a training aid, or in entertainment, e.g. for creating special effects or lighting effects on stage. However, the existing haze generator systems lack the ability to measure haze in order to control the level of haze in real-time, resulting in generation of uneven smoke and potential health issues. In television and film sets, people use atmospheric haze for a variety of reasons. Setting an optimal haze level and maintaining to that level is difficult without a real-time measurement of the current haze level and the ability to set a specific numeric value to a perceived density. Current control systems are working based on the user's eye observations and predetermined cycle on a regular basis with frequent modification of timing.

Currently, a thermo Scientific PDR-1000AN aerosol monitor is used to measure concentrations of theatrical smoke, fog and haze. The monitor measures the light scattering produced by particles in the air and reports the results in terms of mass concentration (milligrams per cubic meter, or $mg/m^3$) with the assumption that the particles in the air are a fine dust. Because different types of particles have different light scattering properties, the readings from the monitor need to be adjusted (or calibrated) when measuring something other than dust (such as fog droplets). The user converts the dust readings to the correct $mg/m^3$ readings for the fog droplets by multiplying the dust readings by a calibration factor for the particular fog fluid/fog machine combination being used for the fog, smoke or haze effect.

However, the existing monitors are not capable of controlling the haze presented in the atmosphere in real time. The existing monitors also lack the ability to provide exact readings of the haze level as it works in assumption. Consequently, the user or operator could not effectively operate the haze generator based on the presented haze level. Further, the existing monitoring systems are very expensive.

Therefore, there is a need to provide an efficient apparatus and method for effectively monitoring haze and/or particulates in the air and controlling the haze generator for producing smoke at any desired level. Further, there is also a need to provide an inexpensive apparatus for real-time monitoring of haze and/or particulates in the air or atmosphere.

SUMMARY OF THE INVENTION

In an embodiment, an apparatus used for monitoring haze and/or particulate level in the air is disclosed. In one embodiment, the apparatus for monitoring haze level is a stand-alone apparatus. In one embodiment, the apparatus comprises a housing defining a chamber or cavity. The housing further includes one or more apertures. In one embodiment, the apparatus further comprises a detecting unit. The detecting unit is configured to detect the haze levels in real time. In one embodiment, the apparatus further comprises a controller. The controller is securely positioned within the chamber of the housing. In one embodiment, the controller is configured to receive the data related to haze level from the detecting unit via a wired connection. In one embodiment, a display is securely mounted on the housing. The display is configured to display the data related to haze level. In one embodiment, the apparatus further comprises a control switch. The control switch is positioned within the housing, which is accessed via the aperture. The control switch is configured to enable a user to control a haze generator, thereby enabling the user manage haze level. Additionally, knobs or buttons can be used in lieu of or in addition to the switches. In one embodiment, a safety cover is provided with the control switch. In some embodiments, the apparatus is further configured to automatically control the haze generator via the controller based on the haze level detected by the detecting unit.

In one embodiment, the detecting unit further comprises one or more haze sensors. In one embodiment, the sensors are configured to communicate to the controller via a wired connection. The wired connection is implemented via one or more nodes including, but not limited to, Artnet/sACN nodes, an open sound control (OSC), a transmission control protocol (TCP), and a user datagram protocol (UDP) based on an ethernet protocol. In some embodiments, the sensors are further configured to wirelessly communicate to the controller via a wireless communication. In one embodiment, the wireless communication is at least any one of, but not limited to, a radio frequency communication, LoRa™ radio, WIFI, and a mesh network. In some embodiments, the sensors could be a laser based particulate sensors. The laser based particulate sensors are configured to measure haze level in the air and transmits the data to a controller. The controller is configured to display each current reading based on a variable level (controlled locally or remotely) to trigger an outside system to turn on or off the haze generating devices. In one embodiment, the apparatus further comprises a rotary switch, positioned on the housing. The rotary switch is configured to enable a user to input a setpoint to attain and maintain a desired haze level using the haze generator.

In one embodiment, the apparatus further comprises different control protocols for controlling a system and apparatus. In one embodiment, the control protocols could be, but not limited to, an open sound control (OSC), a musical instrument digital interface (MIDI), an Art net protocol, a transmission control protocol (TCP), and a user datagram protocol (UDP). The control protocols are used for transmitting signals over, but not limited to, USBs, an ethernet network, and a wireless communication. The Art net protocol transfers data over the ethernet network. In one embodiment, the apparatus further comprises Art-Net and sACN nodes for transmitting and receiving data related to haze level.

In one embodiment, a method for controlling a haze generator using the apparatus is disclosed. At one step, the haze level is monitored using one or more haze sensors. At another step, the data related to haze level is transmitted from the haze sensors to a controller of the apparatus via a wireless communication. At another step, a user could set a set point of the haze level using the rotary switch and the display. At another step, the data related to the haze level is analyzed using the controller and displayed at the display. Further, the haze generator is triggered and controlled at predetermine time periods to maintain a desired haze level.

In one embodiment, the controller could be, but not limited to, an Arduino microcontroller. In one embodiment, a LoRa™ module is connected to the controller. The LoRa™ module is configured to provide a long-range wireless communication. In one embodiment, the display is connected to the controller using connectors/wires. In one embodiment, the apparatus further comprises one or more ports, for example, MIDI ports. One or more ports are used for transmitting and receiving signals over, but not limited to, USBs and the ethernet network.

In another embodiment, the apparatus uses one or more sensors for monitoring haze level in the air. In another embodiment, the apparatus is a multi-sensor apparatus. In one embodiment, the controller of the apparatus is configured to receive the data related to haze level from one or more haze sensors via a wireless communication. In another embodiment, the controller is configured to receive the data related to haze level from the sensors via a wired connection. In a preferred embodiment, the controller of the apparatus is configured to receive the data related to haze level from one or more haze sensors via a LoRa™ radio communication. In one embodiment, the apparatus further comprises an antenna. The antenna is configured to receive the data related to the haze level from the sensors. In one embodiment, the user could use at least three sensors, positioned at different locations or places.

In one embodiment, the haze sensors are configured to transfer data related to haze level to the apparatus via a wired connection. The haze sensors are directly connected to the controller of the apparatus using a wire or a cable. In another embodiment, the haze sensors are further configured to transfer data related to haze level to the apparatus via a wireless communication. In one embodiment, the wireless communication is at least any one of, but not limited to, a radio frequency communication, LoRa™ radio, Wi-Fi, and a mesh network. The controller of the apparatus is configured to receive data related to the haze level from the haze sensor via at least any one of, but not limited to, the wireless communication and the wired connection. In one embodiment, the haze sensors further comprise a fan or a blower to pull air into the unit. In one embodiment, the haze sensors further comprise a microcontroller. The haze sensors are further configured to transfer the real-time serial data related to haze level to the microcontroller. The microcontroller is configured to read the data related to haze level from the haze sensors and transmits to the controller of the apparatus.

Other objects, features and advantages of the present invention will become apparent from the following detailed description and accompanying drawings. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

A more complete understanding of the present invention, and the advantages and features thereof, will be more readily understood by reference to the following detailed description when considered in conjunction with the accompanying drawings wherein.

DETAILED DESCRIPTION OF EMBODIMENTS

A description of embodiments of the present invention will now be given. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the following description. All changes that come within the meaning and range of equivalency of the claims are to be embraced within their scope.

Figure 1:
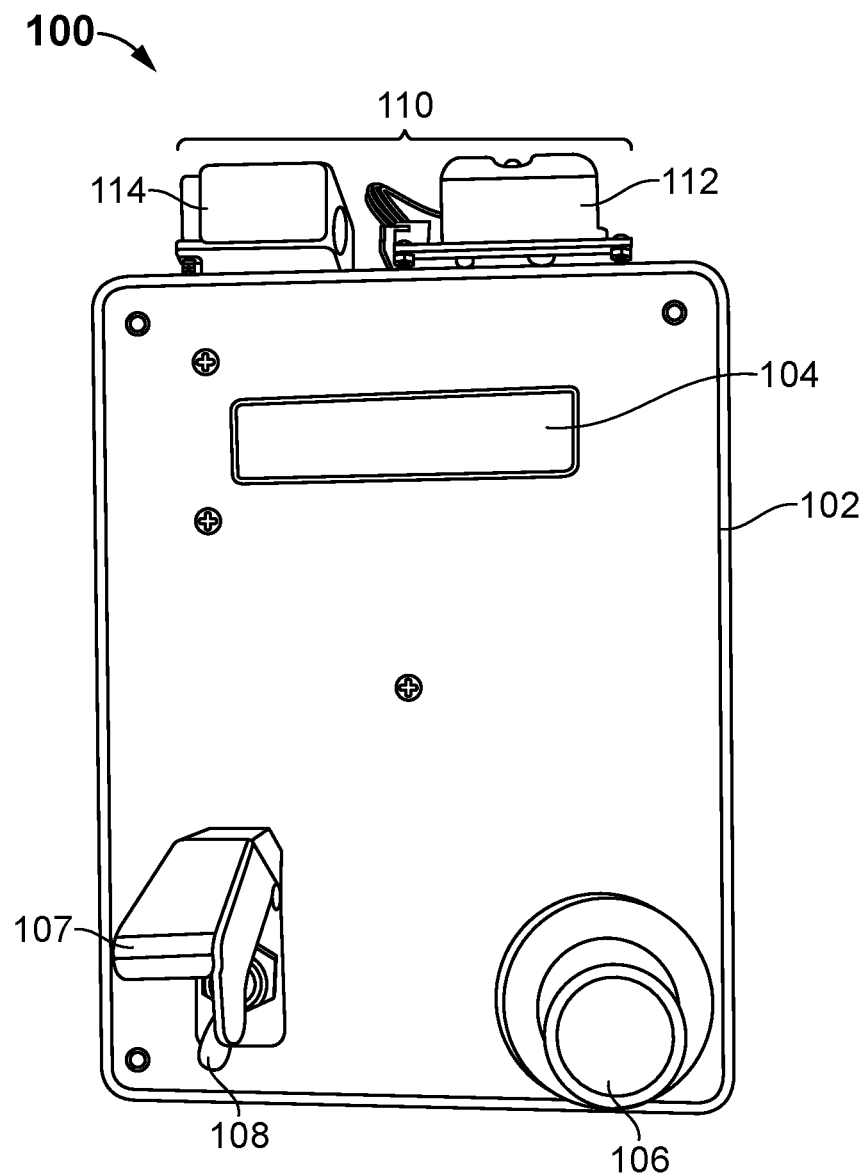
FIG. 1 exemplarily illustrates a front perspective view of the apparatus for monitoring haze level to control a haze generator in an embodiment of the present invention.

Referring to FIG. 1, an apparatus 100 for monitoring haze and/or particulate level in the air is disclosed. It is to be understood that the present invention detects, monitors and controls various types of particulate matter whether such are tiny particles that consist of dry solid fragments, solid cores with liquid coatings, and/or small droplets of liquid. These particles vary greatly in shape, size and chemical composition, and can be made up of many different materials such as metals, soot, soil, and dust. It is to be further understood that haze as used herein is not to be considered limiting and rather can be interchangeable with mist, fog, smog, smoke, vapor or steam.

In one embodiment, the apparatus 100 for monitoring haze level is a stand-alone apparatus. In one embodiment, the apparatus 100 comprises a housing 102 defining a chamber or cavity. The housing 102 further includes one or more apertures. In one embodiment, the apparatus 100 further comprises a detecting unit 110, positioned on the housing 102 of the apparatus 100. It is to be understood, however, that detecting unit 110 can be separate from the housing 102. The detecting unit 110 is configured to detect haze level in real time. In one embodiment, the apparatus further comprises a controller 120. The controller 120 is securely positioned within the chamber of the housing 102. In one embodiment, the controller 120 is configured to receive the data related to haze level from the detecting unit via a wired connection. In one embodiment, a display 104 securely mounted on the housing 102. The display 104 is configured to display data related to haze level. In one embodiment, the apparatus 100 further comprises a control switch 108. It is to be understood that knobs or buttons may be use in addition to in lieu of the switch 108. The control switch 108 is positioned within the housing 102, which is accessed via the aperture. The control switch 108 is configured to enable a user to control a haze generator at predetermined time periods using the control switch 108 for maintaining a desired haze level. In one embodiment, a safety cover 107 is provided with the control switch 108. In some embodiments, the apparatus 100 is further configured to automatically control the haze generator via the controller 120 based on the haze level detected by the detecting unit 110.

In one embodiment, the detecting unit 110 further comprises one or more haze sensors (112 and 114). In one embodiment, the sensors (112 and 114) are configured to communicate to the controller 120 via a wired connection. The wired connection is implemented via one or more nodes, but not limited to, Artnet/sACN nodes, an open sound control (OSC), a transmission control protocol (TCP), and a user datagram protocol (UDP) based on an ethernet protocol. In some embodiments, the sensors (112 and 114) are further configured to wirelessly communicate to the controller 120 via a wireless communication. In one embodiment, the wireless communication is at least any one of, but not limited to, a radio frequency communication, LoRa™ radio, WIFI, and a mesh network. In some embodiments, the sensors could be a laser based particulate sensors. The laser based particulate sensors are configured to measure haze level of air and transmits the data to a controller that displays each current reading, and based on a variable level (controlled locally or remotely), triggers an outside system to turn on or off the haze generating devices. In one embodiment, the apparatus 100 further comprises a rotary switch 106, positioned on the housing 102. The rotary switch 106 is configured to enable a user to set a setpoint of haze to maintain a desired haze level using the haze generator.

In one embodiment, the apparatus 100 further comprises different control protocols for controlling a system and apparatus. In one embodiment, the control protocols could be, but not limited to, an open sound control (OSC), a musical instrument digital interface (MIDI), an Art net protocol, a transmission control protocol (TCP), and a user datagram protocol (UDP). The control protocols are used for transmitting signals over, but not limited to, USBs, an ethernet network, and a wireless communication. The Art net protocol transfers data over the ethernet network. In one embodiment, the apparatus 100 further comprises Art-Net and sACN nodes for transmitting and receiving data related to haze level.

In one embodiment, a method for controlling a haze generator using the apparatus 100 is disclosed. At one step, the haze level is monitored using one or more haze sensors (112 and 114). At another step, the data related to haze level is transmitted from the haze sensors (112 and 114) to a controller of the apparatus 100 via a wireless communication. At another step, a user could set a set point of the haze level using the rotary switch 106 and the display 104. At another step, the data related to the haze level is analyzed using the controller 120 and displayed via the display 104. Further, at step, the haze generator is triggered and controlled at predetermine time periods to maintain a desired haze level.

Figure 2:
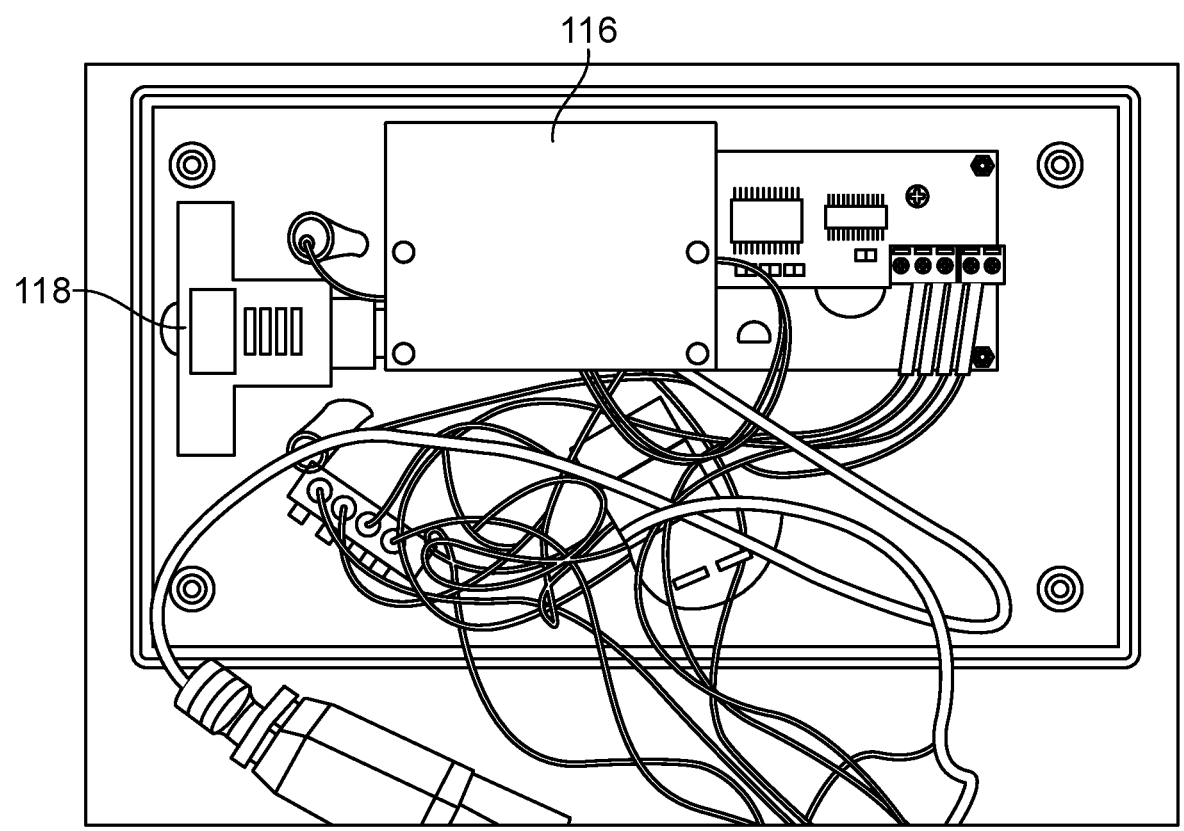
FIG. 2 exemplarily illustrates an inner portion of the apparatus for monitoring haze level in one embodiment of the present invention.
Figure 3:
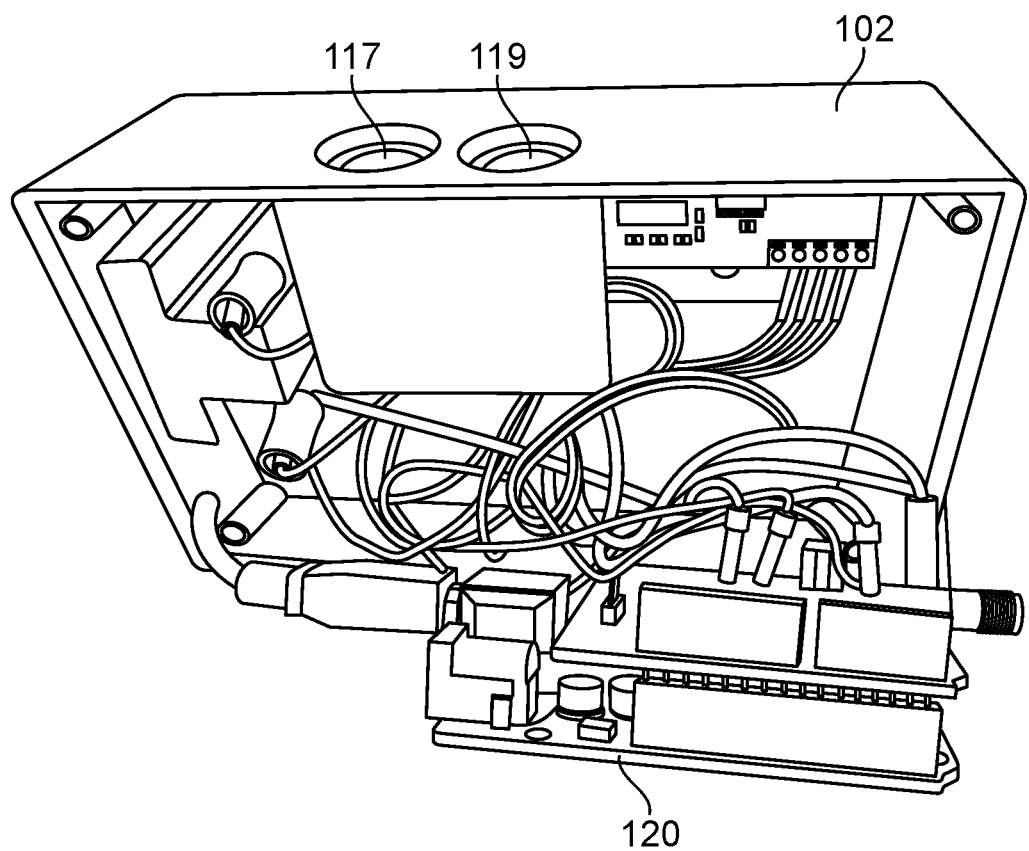
FIG. 3 exemplarily illustrates an inner portion of the apparatus provided with a controller in one embodiment of the present invention.

Referring to FIG. 2, an inner portion of the housing 102 of the apparatus 100 is disclosed. In one embodiment, the inner portion of the housing 102 further comprises a MIDI breakout board 116. The MIDI breakout board 116 is provided with at least two ports. The MIDI breakout board 116 is further connected to the controller 120 via connectors/wires. In one embodiment, the apparatus 100 further comprises, but not limited to, one or more ports 118, for example, an USB connecting port. The port 118 is used for transmitting and receiving signals over, but not limited to, USBs and the ethernet network. Referring to FIG. 3, the controller 120 of the apparatus 100 is disclosed. In one embodiment, the controller 120 could be, but not limited to, an Arduino microcontroller. In one embodiment, a LoRa™ module is connected to the controller 120. The LoRa™ module is configured to provide a long-range wireless communication, which enables the controller 120 to wirelessly communicate to one or more haze sensors via the wireless communication. In one embodiment, the display 104 of the apparatus 100 is further connected to the controller 120 using connectors/wires. In one embodiment, the apparatus 100 further comprises one or more ports, for example, MIDI ports (117 and 119). The ports, for example, MIDI ports (117 and 119) are used for transmitting and receiving signals over, but not limited to, USBs and the ethernet network.

Figure 4:
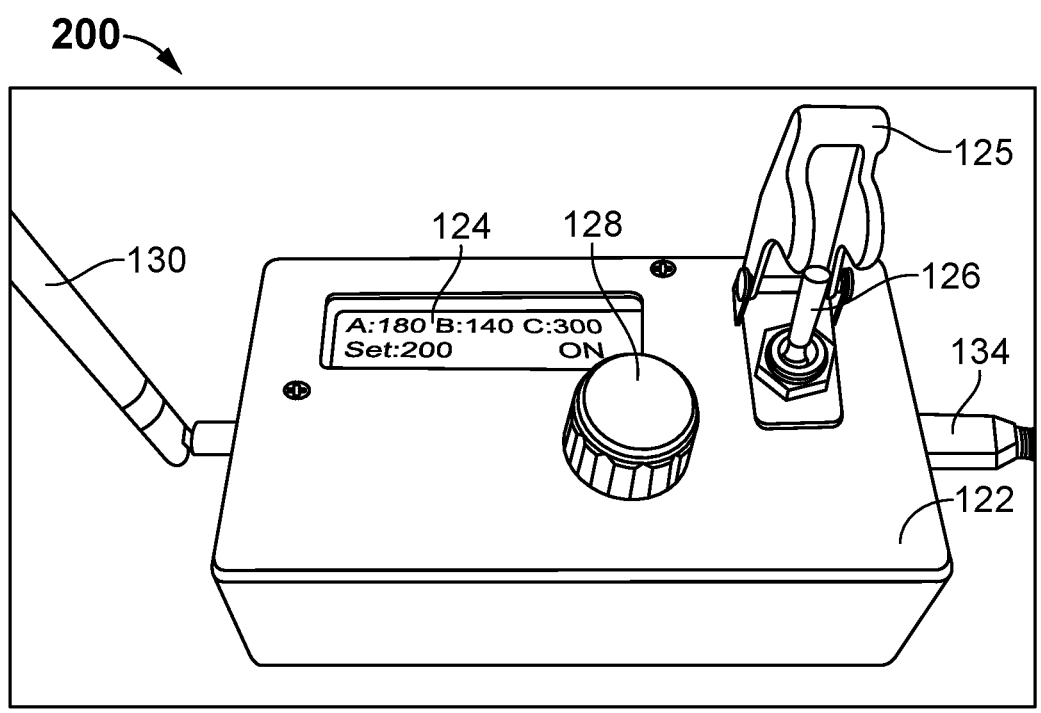
FIG. 4 exemplarily illustrates the ON or activated position of the apparatus in another embodiment of the present invention.

Referring to FIG. 4, the ON or activated position of the apparatus 200 is disclosed. In one embodiment, the apparatus 200 is configured to monitor the haze level in real time. In one embodiment, the apparatus 200 for monitoring haze level is a multi-sensor apparatus. The apparatus 200 comprises a housing 122 defining a chamber with one or more apertures. In one embodiment, the apparatus 200 further comprises one or more haze sensors. The sensors are positioned at desired locations or places to detect the haze level in real time. In a preferred embodiment, at least three haze sensors are used to monitor the haze level. In one embodiment, the apparatus 200 further comprises a controller. The controller is securely positioned within the chamber of the housing 122. In one embodiment, the controller of the apparatus 200 is configured to receive data related to haze level from one or more haze sensors via a wireless communication. In another embodiment, the controller is configured to receive the data related to haze level from the sensors via a wired connection. In a preferred embodiment, the controller of the apparatus 200 is configured to receive data related to haze level from one or more haze sensors via a LoRa™ radio communication. In one embodiment, a display 124 is securely mounted on the housing 122 of the apparatus 200. The display 124 is configured to display data related to the haze level. In one embodiment, the apparatus 200 further comprises a control switch 126. The control switch 126 is positioned within the housing 122, which is accessed via the aperture. The control switch 126 is configured to enable the user to control the haze generator for managing haze level. In one embodiment, a safety cover 125 is provided with the control switch 126. In some embodiments, the apparatus 200 is further configured to automatically control the haze generator via the controller based on the detected haze level. In one embodiment, the apparatus 200 further comprises an antenna 130. The antenna 130 is configured to receive data related to the haze level from the sensors.

In one embodiment, the apparatus 200 further comprises a rotary switch 128, positioned on the housing 122. The rotary switch 128 is configured to enable a user to set a setpoint of haze to attain and maintain a desired haze level using the haze generator. In an exemplary embodiment, the user could set the set point of the haze level about 0-1000 ug/m$^3$ using the rotary switch 128. In one embodiment, the apparatus 100 comprises at least three sensors, positioned at different locations or places. In an exemplary embodiment, one sensor reads the haze level as 180 ug/m$^3$, another sensor reads the haze level as 140 ug/m$^3$, and the last sensor reads the haze level as 300 ug/m$^3$. The user set the haze level is as 200 ug/m$^3$. If the monitored haze level is below the set point, for example, 200 ug/m$^3$, then the apparatus 200 is configured to trigger on or activate the haze generator to manage the haze level.

Figure 5:
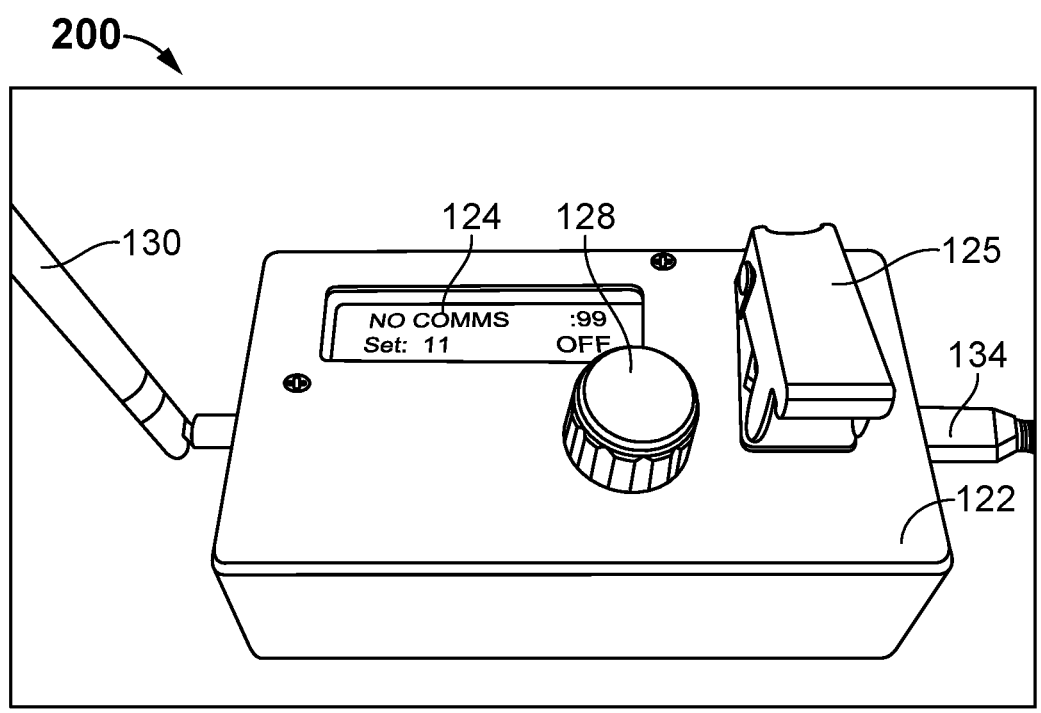
FIG. 5 exemplarily illustrates the OFF or deactivated position of the apparatus in another embodiment of the present invention.

Referring to FIG. 5, the OFF or deactivated position of the apparatus 200 is disclosed. In one embodiment, the apparatus 200 comprises at least three sensors, positioned at different locations or places. In a preferred embodiment, the user has set the set point of the haze level at 11 ug/m$^3$. If the monitored haze level is above the set point, then the user could trigger off the haze generator using the apparatus 200 via the controller using the control switch 126 to maintain the haze level. In another embodiment, the apparatus 200 automatically trigger off or deactivate the haze generator based on the monitored haze levels via the controller.

Figure 6:
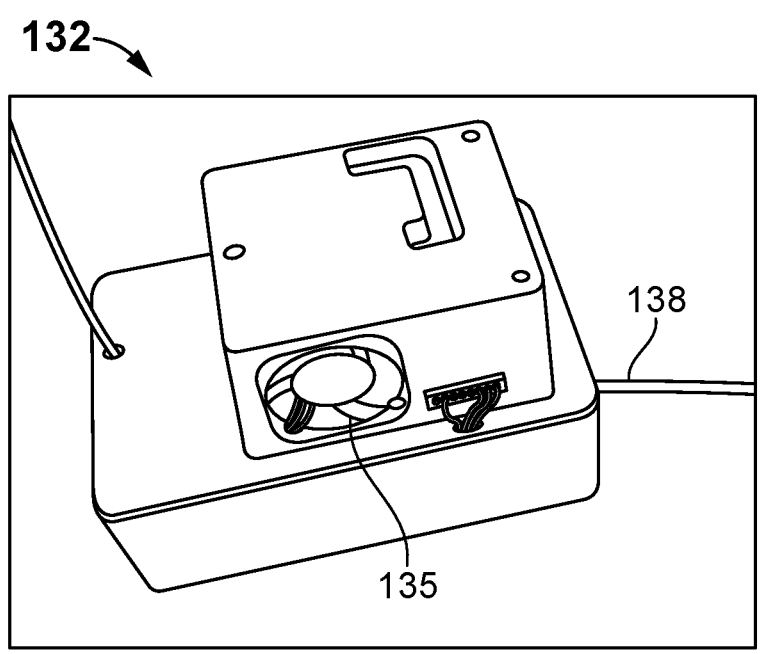
FIG. 6 exemplarily illustrates a perspective view of the haze sensor of the apparatus for monitoring haze level in one embodiment of the present invention.

Referring to FIG. 6, the haze sensor 132 of the apparatus 200 is disclosed. The haze sensor 132 is used to monitor the haze level. In one embodiment, the haze sensor 132 is configured to transfer data related to haze level to the apparatus 200 (shown in FIG. 4) via a wired connection. The haze sensor 132 is directly connected to the controller of the apparatus 200 using a wire or a cable 138. In another embodiment, the haze sensor 132 is further configured to transfer data related to haze level to the apparatus 200 via a wireless communication. In one embodiment, the wireless communication is at least any one of, but not limited to, a radio frequency communication, LoRa™ radio, Wi-Fi, and a mesh network. The controller of the apparatus 200 is configured to receive data related to the haze level from the haze sensor 132 via at least any one of, but not limited to, the wireless communication and the wired connection. In one embodiment, the haze sensor 132 further comprises a fan or a blower 135 to pull air into the haze sensor 132.

Figure 7:
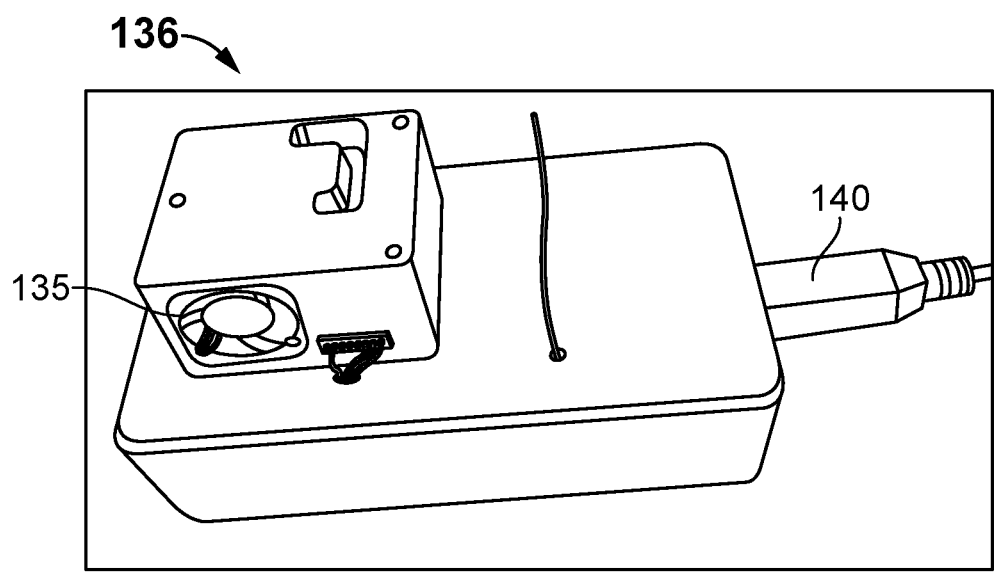
FIG. 7 exemplarily illustrates a perspective view of the haze sensor of the apparatus for monitoring haze level in another embodiment of the present invention.

Referring to FIG. 7, the haze sensor 136 of the apparatus 200 is disclosed. In another embodiment, the haze sensor 136 of the apparatus 200 is used to monitor the haze level. In one embodiment, the haze sensor 136 is configured to transfer data related to haze level to the apparatus 200 via a wired connection. In another embodiment, the haze sensor 136 is directly connected to the controller of the apparatus 200 using, but not limited to, a USB cable 140. The USB cable 140 is removable and supplies power to the haze sensor 136. In another embodiment, the haze sensor 136 is further configured to transfer the data related to haze level to the apparatus 200 via a wireless communication. In one embodiment, the wireless communication is at least any one of, but not limited to, a radio frequency communication, LoRa™ radio, Wi-Fi, and a mesh network. The controller of the apparatus 200 is configured to receive data related to haze level from the haze sensor 136 via at least any one of, but not limited to, the wireless communication and the wired connection. In one embodiment, the haze sensor 136 further comprises a fan or a blower 135 to pull air into the haze sensor 136.

In one embodiment, the user could set different haze levels varying from 0-1000 ug/m$^3$ based on the sensor 136 and user's experience on the present invention, the generalization of haze levels are as follows (haze levels are uncalibrated ug/m$^3$). The haze level varies from 00-10 ug/m$^3$ is un-noticeable in the air unless the illumination of a laser. At 11-50 ug/m$^3$, light from the collimated beam fixtures in air is visualized. At 51-100 ug/m$^3$, columnated beams at the upper end theatrical ellipsoidal fixtures are identified. At 101-200 ug/m$^3$, beams could be visualized much more defined in air, however, camera begins to lose black level at higher haze levels. This range is frequently incorporated in television (TV) performing talent shows. At 200-800 ug/m$^3$, beams could be viewed by the user in air, leads to asthma or any other breathing related health issues. In addition, cameras are difficult to focus and require an increase in light intensity to focus on their subject matter. At 800-1000 ug/m$^3$, provides a user in foggy atmosphere. In addition, cameras are difficult to focus and require an increase in light intensity to focus on their subject matter.

Figure 8:
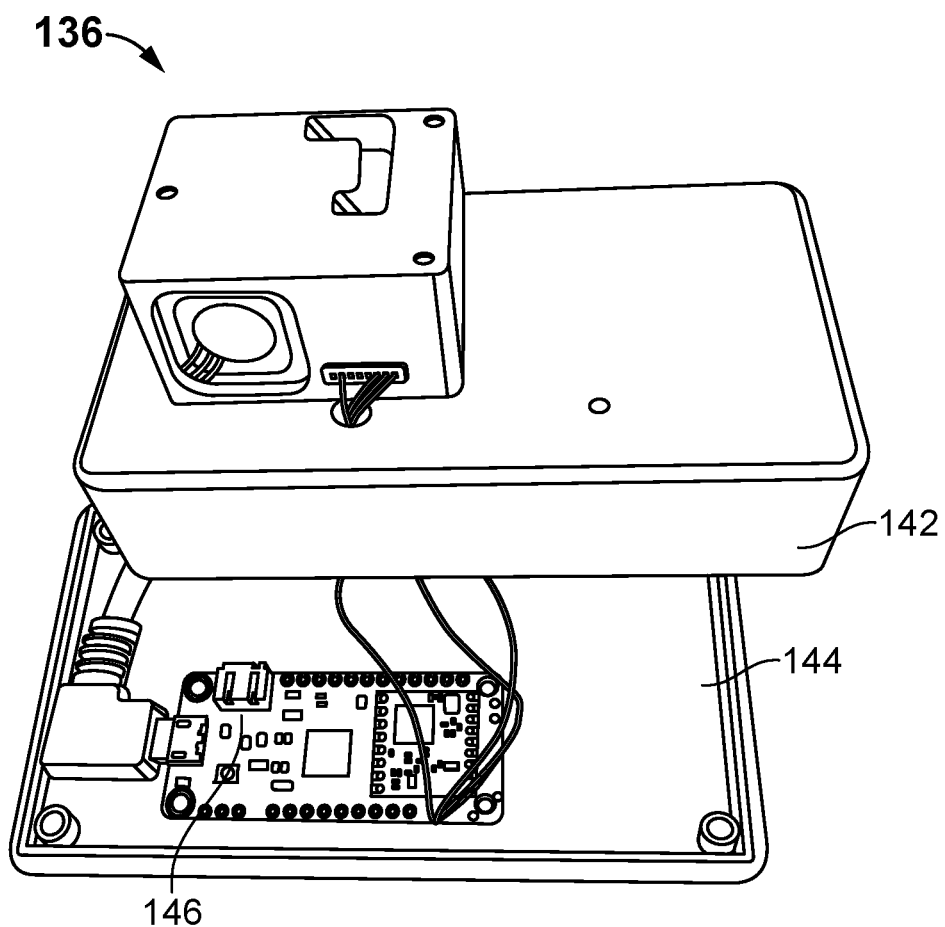
FIG. 8 exemplarily illustrates an inner portion of the haze sensor of the apparatus in one embodiment of the present invention.

Referring to FIG. 8, an inner portion of the haze sensor 136 is disclosed. In one embodiment, the haze sensor 136 include a housing 142 with a cavity 144. The cavity 144 of the housing 142 houses a microcontroller 146. The haze sensors (132 and 136) are further configured to transfer the real-time serial data related to haze level to the microcontroller 146. The microcontroller 146 is configured to read the data related to haze level from the haze sensors (132 and 136) and transmits to the controller of the apparatus 200.

Figure 9A:
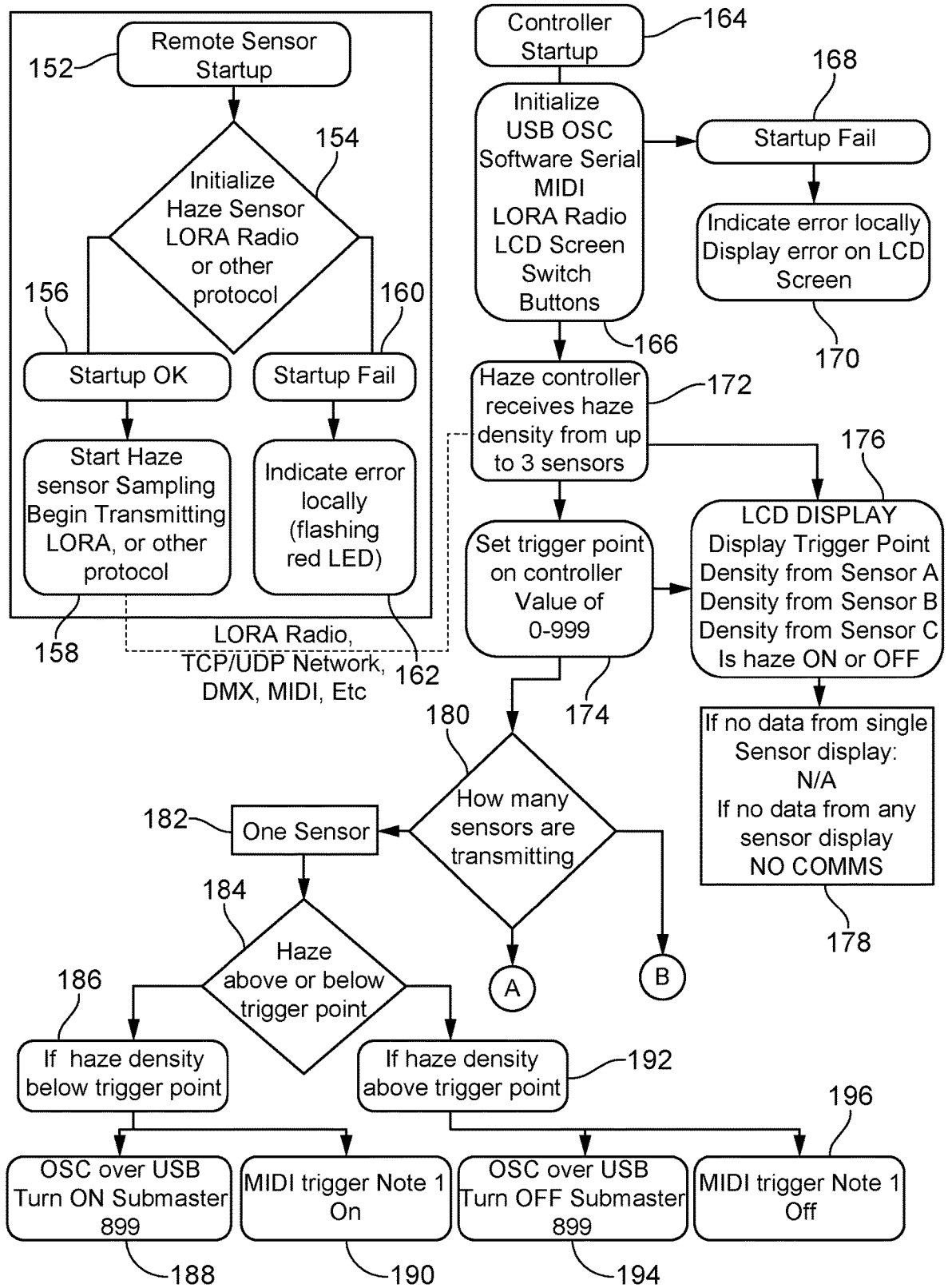
FIGS. 9A-9C exemplarily illustrates a method for monitoring haze level using one or more sensors using the apparatus in one embodiment of the present invention.
Figure 9B:
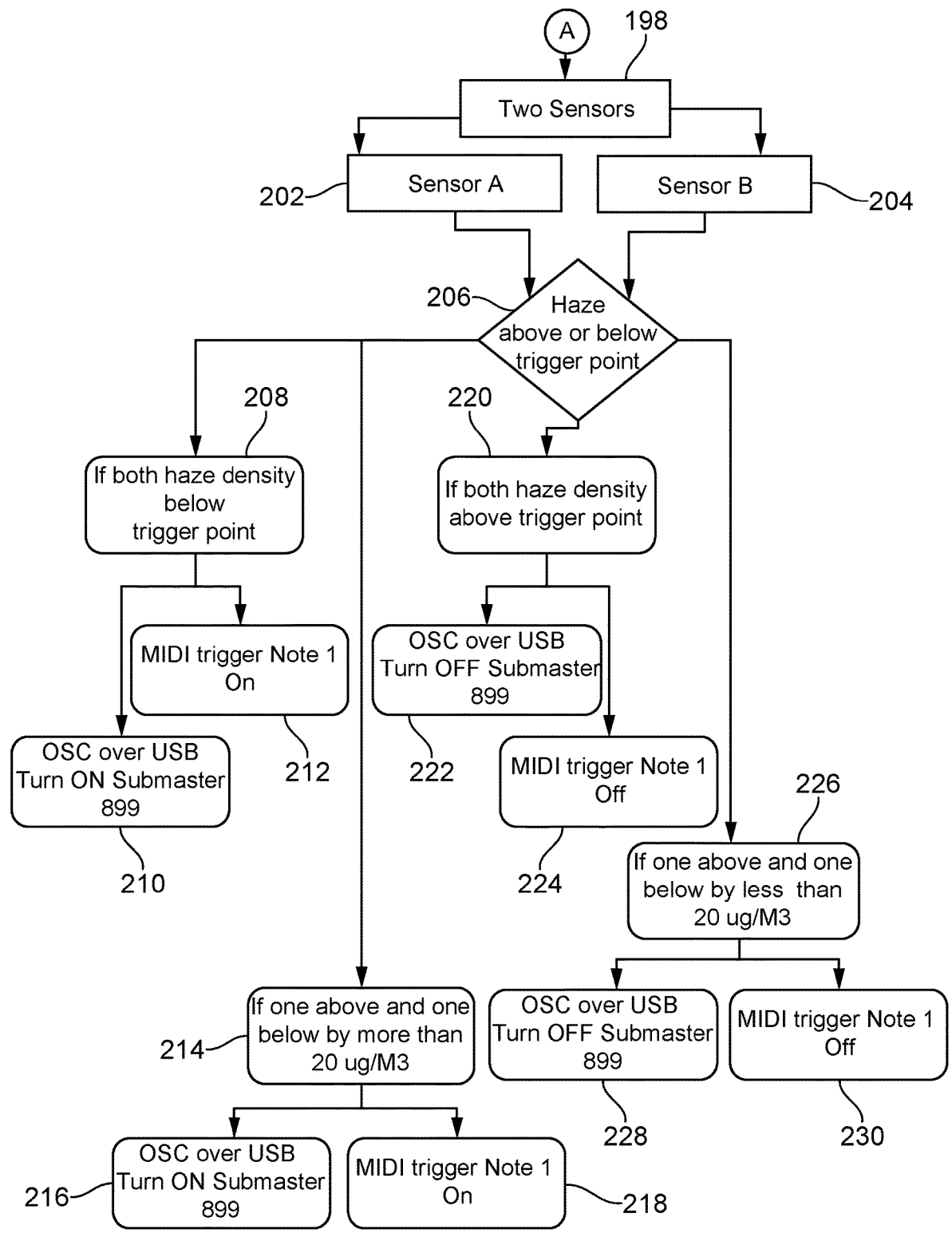
Figure 9C:
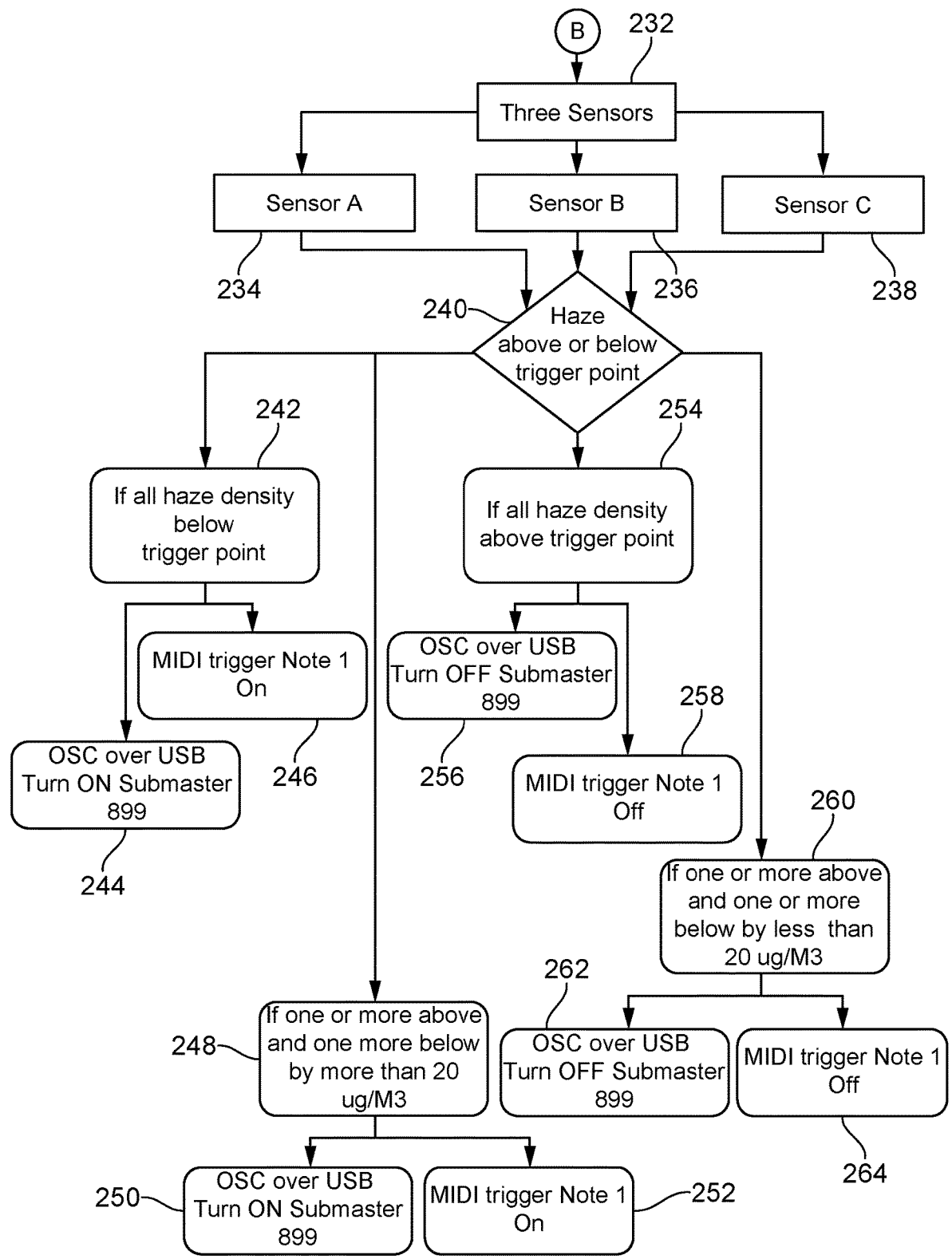

Referring to FIGS. 9A-9C, a method 150 for monitoring and controlling the haze level using one or more sensors, is disclosed. At step 152, the remote sensor is started up. At step 154, the control protocol for example, a LoRa™ radio protocol is initialized. At step 156, startup process is successfully completed. If the startup process is successfully completed, the control protocol starts to transmit data related to haze level to the controller via a wireless communication, for example, LoRa™ radio, TCP/UDP network, DMX, MIDI, etc., at step 158. If the startup process is failed at step 160, then it will indicate an error locally by flashing a light, for example, a red color light emitting diode (LED), at step 162.

At step 164, the controller of the apparatus 200 is started up. At step 166, the USB OSC software serial, MIDI LoRa™ radio, a display, for example, an LCD screen, and switches are initialized. At step 168, if the startup is failed, then it will indicate an error locally by displaying an error on the LCD screen, at step 170. At step 172, if the startup is completed, the haze controller receives haze density from up to, but not limited to, haze sensors such as sensor A, sensor B and sensor C. At step 174, the user could set a trigger point on controller from 0 to 999 using a rotary switch 128 via the display 124. At step 176, the display indicates the trigger point, density of haze monitored by the sensor A, sensor B, and the sensor C, and also indicates whether the haze is in ON or OFF state. At step 178, if there is no data from sensors, then display 124 indicates NO COMMS. At step 180, the controller checks the number of sensors connected to the apparatus 200. The step 180 is further continued at the point A and point B.

At step 182, at least one sensor is connected to the apparatus 200. At step 184, the controller checks whether the haze density/level is above a trigger point or below a trigger point. At step 186, the haze density monitored by the controller is below a trigger point. if the haze density is below a trigger point, then the submaster, for example, a haze generator is turned ON via the OSC protocol over USB at step 188. At step 190, the MIDI trigger note 1 is ON. At step 192, the haze density monitored from the sensor is identified by the controller is above a trigger point. If the haze density is above a trigger point, then the submaster, for example, a haze generator is turned OFF via the OSC protocol over USB, at step 194. At step 196, the MIDI trigger note 1 is OFF.

At step 198, the apparatus 200 uses at least two sensors. At step 202, the sensor A is used to monitor the haze density at one location. At step 204, the sensor B is used to monitor the haze density at another location. At step 206, the controller checks whether the haze density/level is above a trigger point or below a trigger point. At step 208, the haze density monitored by sensors A and B is below the trigger point. The submaster, for example, a haze generator is turned ON via the OSC protocol over USB at step 210. At step 212, the MIDI trigger note 1 is ON.

At step 214, the haze density monitored from one sensor is above the trigger point and another sensor is below by more than 20 μg/m³. If the haze density from one sensor is above the trigger point and another sensor is below by more than 20 μg/m³, then the submaster, for example, a haze generator is turned ON via the OSC protocol over USB, at step 216. At step 218, the MIDI trigger note 1 is ON.

At step 220, the haze densities monitored from both the sensors are above the trigger point. The submaster, for example, a haze generator is turned OFF via the OSC protocol over USB, at step 222. At step 224, the MIDI trigger note 1 is OFF.

At step 226, the haze density monitored from one sensor is above the trigger point and another sensor is below by less than 20 μg/m³. The submaster, for example, a haze generator is turned OFF via the OSC protocol over USB, at step 228. At step 230, the MIDI trigger note 1 is OFF.

At step 232, the apparatus 200 uses at least three sensors. At step 234, the sensor A is used to monitor the haze density at one location. At step 236, the sensor B is used to monitor the haze density at another location. At step 238, the sensor C is used to monitor the haze density at another location. At step 240, the controller checks whether the haze density/level is above a trigger point or below a trigger point. At step 242, the haze densities monitored from both sensors A, B, and C are below the trigger point. At step 244, a haze generator is turned ON via the OSC protocol over USB. At step 246, the MIDI trigger note 1 is ON.

At step 248, the haze densities monitored from one or more sensors are above the trigger point and the haze densities monitored from one or more sensors are below by more than 20 μg/m³. The submaster, for example, a haze generator is turned ON via the OSC protocol over USB at step 250. At step 252, the MIDI trigger note 1 is ON.

At step 254, the haze densities monitored from both the sensors are above the trigger point. Then the submaster, for example, a haze generator is turned OFF via the OSC protocol over USB at step 256. At step 258, the MIDI trigger note 1 is OFF.

At step 260, the haze densities monitored from one or more sensors are above the trigger point and the haze densities monitored from one or more sensors are below by less than 20 μg/m³. Then the submaster, for example, a haze generator is turned OFF via the OSC protocol over USB, at step 262. At step 264, the MIDI trigger note 1 is OFF.

The advantages of the present invention include: the apparatus 100 and method for effectively monitoring haze level in the air and controlling the haze generator for producing smoke at any desired level. The apparatus 100 is inexpensive for real-time monitoring of haze level. The apparatus 100 could be used in different applications, but not limited to, a lighting program, a haze level detection system, a smoke trigger point, a smoke alarm system, and an air conditioning system.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. An apparatus for monitoring and controlling a haze level in the air in real time, comprising:
    a detecting unit configured to detect the haze level in the air;
    a controller, in communication with the detecting unit, configured to receive data related to the haze level in the air from the detecting unit; and,
    a control switch, in communication with the controller, configured to receive a signal from the controller to control a haze generator, thereby monitoring and controlling the haze level in the air in real time.

2. The apparatus of claim 1, wherein the haze generator is controlled for a determinate time period for attaining and maintaining a desired haze level in the air.

3. The apparatus of claim 1, further comprising:
    a rotary switch, in communication with the controller, configured to enable a user to set a setpoint for the haze level in the air to attain and maintain a desired haze level using the haze generator.

4. The apparatus of claim 3, wherein the setpoint for the haze level in the air is between 0-1000 ug/m³.

5. The apparatus of claim 1, wherein the detecting unit comprises at least one haze sensor configured to measure the haze level in the air.

6. The apparatus of claim 5, wherein the at least one haze sensor is a laser-based particulate sensor.

7. The apparatus of claim 5, wherein the at least one haze sensors are positioned at desired locations for monitoring the haze level in real time.

8. The apparatus of claim 1, further comprising:
    an antenna for wirelessly receiving at the controller the data from the detecting unit related to the haze level in the air.

9. The apparatus of claim 1, further comprising:
    a display, in communication with the controller, configured to display the data related to the haze level in the air.

10. The apparatus of claim 1, wherein the haze generator is activated when the haze level in the air is below a desired haze level and deactivated when the haze level in the air is above the desired haze level.

11. A method for monitoring and controlling a haze level in the air in real time, comprising the steps of:
- monitoring a haze level in the air using at least one haze sensor;
- transmitting data related to the haze level in the air from the at least one haze sensor to a controller;
- analyzing the data related to the haze level in the air; and,
- activating a haze generator for a determinate time period to maintain a desired haze level in the air.

12. The method according to claim 11, further comprising the step of:
- setting a setpoint of the desired haze level in the air.

13. The method according to claim 12, wherein the step of setting the setpoint is accomplished using a rotary switch.

14. The method according to claim 11, wherein the setpoint for the desired haze level in the air is between 0-1000 ug/m$^3$.

15. The method according to claim 11, wherein the step of analyzing the data related to the haze level in the air is accomplished by a controller.

16. The method according to claim 11, wherein the determinate time period for activation of the haze generator is based upon obtaining a pre-established haze density in the air.

17. The method according to claim 16, wherein the pre-established haze density in the air comprises:
- a haze level of 00-10 ug/m$^3$ wherein haze is un-noticeable in the air unless illuminated by a laser;
- a haze level of 11-50 ug/m$^3$ wherein light from a collimated beam fixture is visualized;
- a haze level of 51-100 ug/m$^3$ wherein columnated beams from an upper end theatrical ellipsoidal fixture is visualized;
- a haze level of 101-200 ug/m$^3$ wherein a light beam is visually more defined in air;
- a haze level of 200-800 ug/m$^3$ wherein a light beam in the air can be easily viewed; and,
- a haze level of 800-1000 ug/m$^3$ wherein a foggy atmosphere is provided.

18. The method according to claim 11, wherein the desired haze level in the air corresponds to a pre-established haze density in the air.

19. The method according to claim 11,
- wherein when the monitored haze level in the air by a first sensor of the at least one haze sensor is above the desired haze level and the monitored haze level in the air by a second sensor of the at least one haze sensor is below the desired haze level by more than 20 ug/m$^3$ then the haze generator is activated, and,
- further wherein when the monitored haze level in the air by the first sensor of the at least one haze sensor is above the desired haze level and the monitored haze level in the air by the second sensor of the at least one haze sensor is below the desired haze level by less than 20 ug/m$^3$ then the haze generator is deactivated.

20. The method according to claim 11,
- wherein when the monitored haze level in the air by a first one or more sensors of the at least one haze sensor is above the desired haze level and the monitored haze level in the air by a second one or more sensors of the at least one haze sensor is below the desired haze level by more than 20 ug/m$^3$ then the haze generator is activated, and,
- further wherein when the monitored haze level in the air by the first one or more sensors of the at least one haze sensor is above the desired haze level and the monitored haze level in the air by the second one or more haze sensors of the at least one haze sensor is below the desired haze level by less than 20 ug/m$^3$ then the haze generator is deactivated.

* * * * *